United States Patent
Neo et al.

(10) Patent No.: US 11,704,363 B2
(45) Date of Patent: Jul. 18, 2023

(54) SYSTEM AND METHOD FOR GENERATING HIGHLY SCALABLE TEMPORAL GRAPH DATABASE

(71) Applicant: PAYPAL, INC., San Jose, CA (US)

(72) Inventors: Rey Neo, Singapore (SG); Chun Kiat Ho, Singapore (SG); Lin Song, Singapore (SG); Kai Xie, Singapore (SG); Quin Zuo, Cupertino, CA (US); Xin Li, Shanghai (CN); Pengshan Zhang, Shanghai (CN); Meng Zang, Shanghai (CN); Xiaohan Yun, Palo Alto, CA (US); Karl Anton Hennig, San Jose, CA (US); Jun Zhang, Shanghai (CN); Thomas Doran, Palo Alto, CA (US); Jerry Tso, Singapore (SG)

(73) Assignee: PayPal, Inc., San Jose, CA (US)

(*) Notice: Subject to any disclaimer, the term of this patent is extended or adjusted under 35 U.S.C. 154(b) by 216 days.

(21) Appl. No.: 16/627,331

(22) PCT Filed: Dec. 17, 2019

(86) PCT No.: PCT/CN2019/125986
§ 371 (c)(1),
(2) Date: Dec. 29, 2019

(87) PCT Pub. No.: WO2021/120000
PCT Pub. Date: Jun. 24, 2021

(65) Prior Publication Data
US 2021/0334312 A1    Oct. 28, 2021

(51) Int. Cl.
G06F 16/901    (2019.01)
G06F 16/25    (2019.01)
(Continued)

(52) U.S. Cl.
CPC ...... *G06F 16/9024* (2019.01); *G06F 16/2358* (2019.01); *G06F 16/248* (2019.01); *G06F 16/258* (2019.01); *G06N 20/00* (2019.01)

(58) Field of Classification Search
None
See application file for complete search history.

(56) References Cited

U.S. PATENT DOCUMENTS 10,419,469 B1 *   9/2019   Singh ............... H04L 43/06
2013/0325787 A1 *  12/2013  Gerken ............. G06N 5/048
                                                     706/52

(Continued)

OTHER PUBLICATIONS

"Journaling" Computer Desktop Encyclopedia. The Computer Language Company Inc. 2021. Retrieved on Sep. 4, 2021 from https://www.computerlanguage.com/results.php?definition=journaling (Year: 2021).*

(Continued)

*Primary Examiner* — Alex Gofman
*Assistant Examiner* — Umar Mian
(74) *Attorney, Agent, or Firm* — Haynes and Boone, LLP (57) ABSTRACT

Aspects of the present disclosure involve systems, methods, devices, and the like for generating highly scalable temporal graph databases. In one embodiment, a novel architecture is presented that enables the identification of mutation or changes in graphs. For the identification a combination of graph-based modeling and journal entry is used. Events occurring are consumed and changes are ingested, transformed for use by a graph simulation system. The changes are journaled using a vertex centric temporal journaling schema.

20 Claims, 6 Drawing Sheets

(51) Int. Cl.
    *G06F 16/23*         (2019.01)
    *G06F 16/248*       (2019.01)
    *G06N 20/00*        (2019.01)

(56) References Cited

U.S. PATENT DOCUMENTS

| | | | |
|---|---|---|---|
| 2016/0125094 A1* | 5/2016 | Li | G06F 16/9024 |
| | | | 707/741 |
| 2016/0125095 A1* | 5/2016 | Xu | G06F 16/9024 |
| | | | 707/740 |
| 2017/0277769 A1* | 9/2017 | Pasupathy | G06F 16/9027 |
| 2018/0219919 A1* | 8/2018 | Crabtree | G06F 16/2477 |
| 2018/0329958 A1* | 11/2018 | Choudhury | G06F 16/2343 |
| 2018/0367414 A1* | 12/2018 | Raghavendra | H04L 43/0817 |
| 2019/0188332 A1* | 6/2019 | Ingvaldsen | G06N 5/022 |

OTHER PUBLICATIONS

"Journal". Microsoft Computing Dictionary. Fifth Edition. Microsoft Press. 2002. p. 296. (Year: 2002).*
Weisstein, Eric W. "Graph Vertex." From MathWorld—A Wolfram Web Resource. Retrieved on Sep. 7, 2021 from https://mathworld.wolfram.com/GraphVertex.html. (Year: 2021).*

* cited by examiner

SYSTEM AND METHOD FOR GENERATING HIGHLY SCALABLE TEMPORAL GRAPH DATABASE

CROSS-REFERENCE TO RELATED APPLICATIONS

This application is a U.S. National Stage Application under 35 U.S.C. § 371 of International Application No. PCT/CN2019/125986 filed on Dec. 17, 2019, the contents of which are incorporated herein by reference in its entirety.

TECHNICAL FIELD

The present disclosure generally relates to graph databases, and more specifically, to a system and design for generation of highly scalable temporal graph databases.

BACKGROUND

Nowadays with the proliferation of electronics, users are constantly relying on their electronics for access to social media, transacting, authenticating, messaging, etc. However, with such reliance comes the need for complex computations and big data analytics. As such, industry and academia have largely focused on the use of machine learning models for such computational analytics where statistical models can perform tasks without implicit instructions. The use of these machine learning models however requires adequate management of the large data. As such, graphs are often used as efficient data models for understanding relationships between entities which can be used with simulations for the development, training, and verification of graph-based variables used by the machine learning models. In some instances, it is important to understand temporal relationships between two different entities. However, current models do not maintain temporal-dimensions and provide only the latest snapshot of data and its current state. This limitation restricts the simulations that may be run, which can result in inadequate training and can even leave a gap in risk-models, making a user susceptible to loss. Therefore, it would be beneficial to have a system and method for generating a temporal database which can support time travel graph queries.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for generating highly scalable temporal graph databases. In one embodiment, a novel architecture is presented that enables the identification of mutation or changes in graphs. For the identification a combination of graph-based modeling and journal entry is used. Events occurring are consumed and changes are ingested, transformed for use by a graph simulation system. The changes are journaled using a vertex centric temporal journaling schema.

Nowadays with the proliferation of electronics, users are constantly relying on their electronics for access to social media, transacting, authenticating, messaging, etc. However, with such reliance comes the need for complex computations and big data analytics. As such, industry and academia have largely focused on the use of machine learning models for such computational analytics where statistical models can perform tasks without implicit instructions. The use of these machine learning models however requires adequate management of the large data. As such, graphs are often used as efficient data models which can be used with simulations for the development, training, verification of graph-based variables used by the machine learning models. In some instances, it is important to understand temporal relationships between two different entities.

Figure 1A:
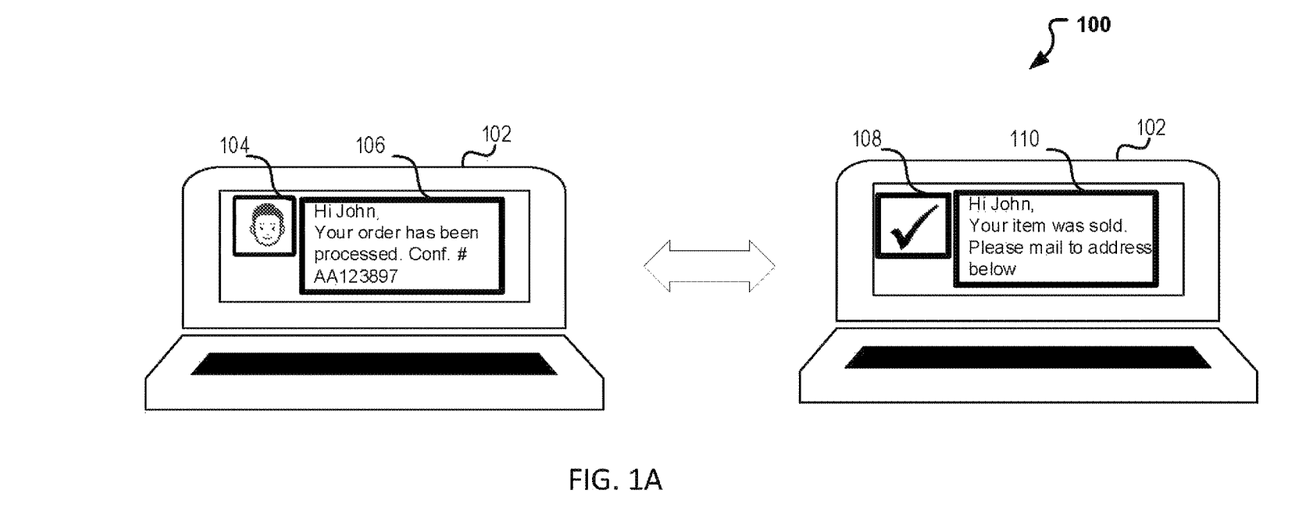
FIGS. 1A-1B illustrates exemplary applications of a temporal relationship.
Figure 1B:
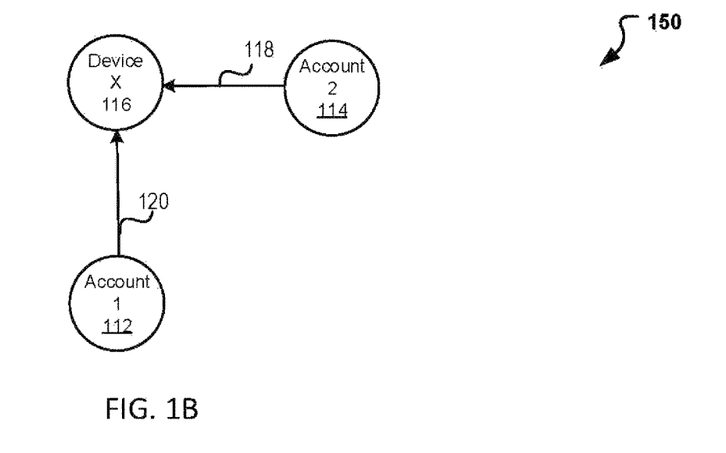

For example, consider FIG. 1A-1B with exemplary diagraphs illustrating a temporal relationship. In particular, FIG. 1A illustrates the use of an application over time whose data may be graph for use with a machine learning model. As illustrated, FIG. 1A includes the use of a device 102 for processing a transaction 106. The device 102 may be a tablet, iPad, cell phone, desktop or the like. For exemplary purposes, device 102 can be a laptop. The device 102 may be used for web browsing, video streaming, bill payments, and online purchases. Additionally, the device 102 may be equipped with applications that enable the user to make purchases and transfers using payment provider applications and/or a digital wallet. Further, the device 102 may be capable of making phone calls and communicating with one or more other communications devices using a cellular network, Wi-Fi, Bluetooth, BLE, NFC, WLAN, etc. The communication can enable the transmission of information from a user account to a secondary source. In addition, the communication can enable the transmission of photographs, pictures, video, biometrics, and the like for user authentication. For example, the device 102 can be used to communicate over an application with a merchant, third-party service provider, or other entity for making a transaction. In the communication, the user may have an account with the entity for transacting. For example, a user 104 may log into an account with a merchant on a user device 102. At the merchant application or website, the user 104 may purchase or process a transaction. Simultaneously or at a later time, the same user 104 may access a same merchant website or application 110 on a same user device 102. The user 104 may receive confirmation 108 of a processing of a transaction. For exemplary purposes, an item may be confirmed sold.

As illustrated in this exemplary process there is a possible indication that the user 104 may have sold and purchased the same item in the transaction. As such, this exemplifies possible seller collusion whereby the seller and the buyer are both trying to claim buyer/seller protection. This is a type of transaction and risk that is undetectable using graph models without temporal data. That is to say, current models do not maintain a temporal-dimensions and provide only the latest snapshot of data and its current state. Therefore, it would be beneficial to have a system and method for generating a temporal database that supports time travel graph queries.

As such, consider FIG. 1B, wherein a graph 150 is generated for illustrating a temporal relationship. To generate a graph 150, a series of vertices 112-116 and edges 118-120 may be used. A vertex is the node which can be used to illustrate a fundamental unit. Two or more vertices 112-116 can be connected by edge 118-120 and the edge 120 is incident on the vertices. For example, on the graph 150, the vertex 116 is represented by a circle with a label (device X 116) and the edge 120 is represented by the line (or arrow) extending between the two vertices 112-116.

Considering FIG. 1B, exemplary graph 150 is generated wherein a device 102 and the accounts associated with the device are illustrated by the nodes 112-116 with edges 118-120. Therefore, returning back to the example of FIG. 1A, device 102 is illustrated by node 116 and the two user accounts (seller/buyer) by nodes 112,114. Thus, the graph 150 representation enables the quick identification of the relationship that exists between the device 102 and the two accounts. As such, with account information and user profile details (e.g., device 102 associated with the user 104) included in the vertices, buyer/seller collusion can be detected. Thus, the graph allows the quick identification of such actors and a response can quickly take place according to the risk model in place.

In one embodiment, in addition to the vertex-based snapshots (graphs 150) an efficient journaling mechanism or schema can be implemented to illustrate the changes (or the change deltas) on a vertex over time to enable a database footprint with very fast query speed. Accordingly, a system and method is introduced for generating highly scalable temporal graph databases with low latency time-travel queries.

Figure 2:
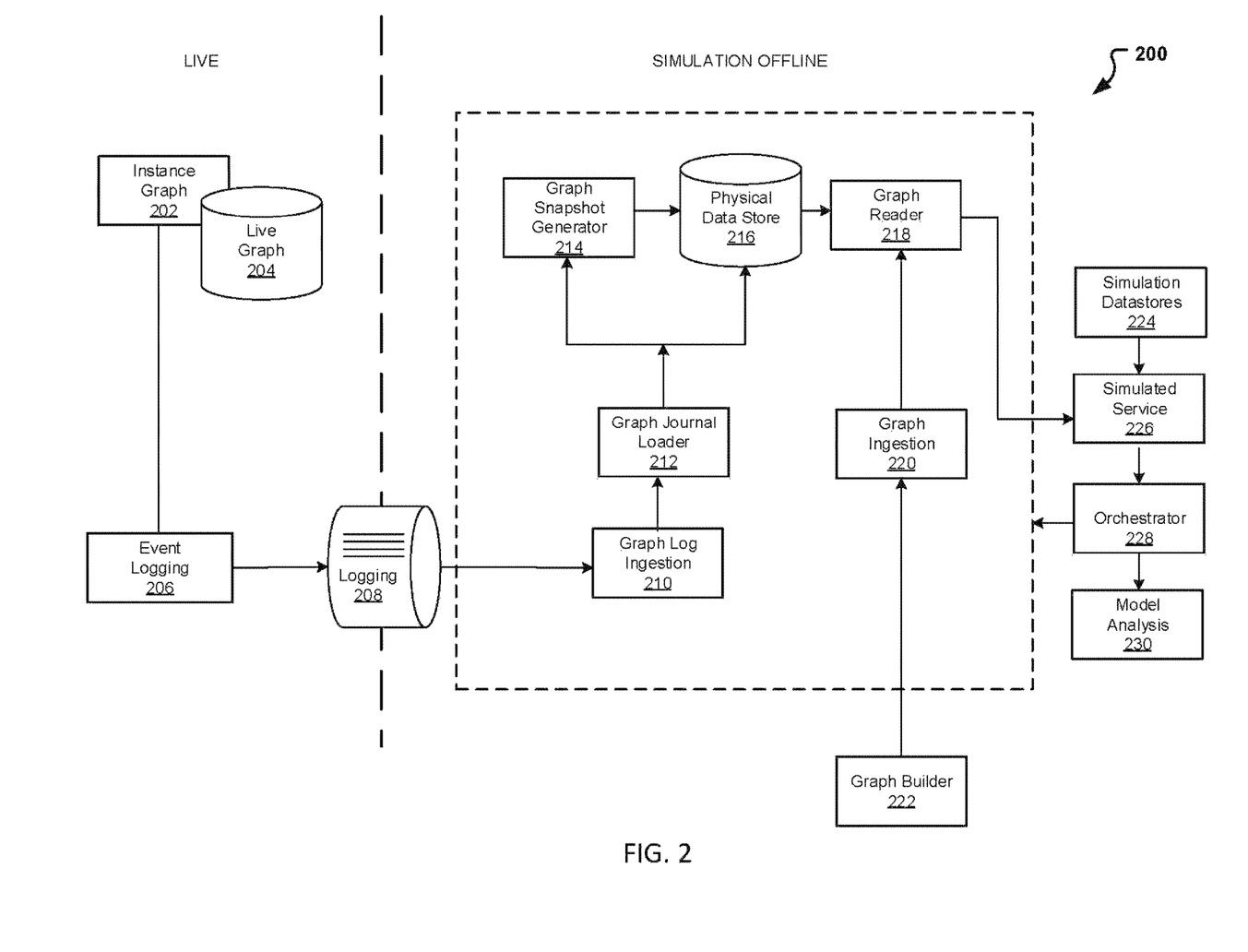
FIG. 2 illustrates a block diagram illustrating an exemplary architecture for generating a highly scalable temporal graph database.

Turning next to FIG. 2, such system is illustrated for generating temporal databases. In particular, FIG. 2 illustrates a block diagram illustrating an exemplary graphing system architecture 200 for generating a highly scalable temporal graph database. As illustrated, the graphing system architecture 200 can include two parts, a left side which can include the incoming and live (real-time) data and the right side which can include the simulation, offline data. At the live part, a data instance and live graph data store is available for the reception of real-time data arriving. Thus, as events are occurring, the graph data store may be storing and maintaining those events. However, if there is a change in the instance graph 202, then event logging occurs at event logging component 206. That is to say, if any changes in the vertices and/or edges occur (e.g., a new vertex getting connected, changed, delete), then it will be documented at the event logging component 205 and then stored in logging database 208. In one embodiment, the logging database 208 can be in the form of a distributed file system, which can be used to manage the large datasets. However in other embodiments, the logging database can be a node, database, server, or other storage entity with the capacity to store the events arriving for the data received.

At the simulation part, a graph simulation system may exist where the logs and corresponding changes (mutations) from the logging database 208, can be ingested by n a graph log ingestion module 210. The log ingestion module 210 may be designed to act as a pipeline for the logs and which can be transmitted for consumption by the graph journal loader 212. The graph journal loader 212 can load those logs provided by the graph log ingestion module 210 and convert them to a form acceptable to the physical data store 216. That is to say, the graph journal loader 212 may act as a means for transforming the incoming logs to a form acceptable for storage and retrieval from the datastore 216. Additionally, or alternatively, the now transformed data (logs) from the graph journal loader 212 can also be received by a graph snapshot generator 214. Graph snapshot generator 214 may be used in instances where a change in the graph exists and/or a new entry in needed. That is to say, the graph snapshot generator 214 determines when to insert the new entries and/or combine them with existing entries. Thus, the graph snapshot generator 214 is designed to determine when to combine the current states of a journal entry and create a new row within a pre-existing entry with the update information.

As new logs are received and new entries created and stored, a graph reader 218 may next be accessed and used for providing a status of data for a particular query and timestamp received. Additionally, the graph reader 218 may also be used to provide temporal graph data access to different types of users. Thus, the graph reader 218 may provide support for other types of queries and/or risk data analytics. Accordingly, as a query comes in, the graph reader 218 can provide a corresponding data associated with the event. For example, consider the transaction example of FIG. 1A, if device 102 was queried at a that particular time, then a journal entry would exist where in both account 1 (for the buyer) and account 2 (for the seller) are accessed for the same transaction. Hence, if the output of the query illustrates that device 102 is being accessed simultaneously by both account 1 and 2 at that time, an alert can be set indicated possible collusion. As another example, a risk analysis query may be received wherein the service for the temporal graph data may be used and analyzed to determine and identify if and when fraud incidents exist.

Output from the graph reader 218 the information is provided to a simulated service module 226 which is the service that may be making the request. In addition to the information received for the particular query and timestamp requested, additional constructed or offline information may be received at the graph reader 218 from the graph ingestion component 220. The graph ingestion component 220 in a component which may be optionally used for use in making "what if" analysis. Therefore, users and/or external systems may inject additional offline generated graph information which can be used in conjunction with the historical graph data retrieved from the physical data store 216. "What if" analysis can include those analysis wherein the offline generated graph (created by the graph builder 222) can be used to make further predictions. For example, analysis can include what happens to the simulation or results if an additional graph entry is added, or what if the graph was in a particular state, or what if new vertices are added that didn't previously exist, etc. Therefore, further to the results and entries identified, the graph reader 218 is also providing (to the simulated service 226), additional entry results which were a function of the graph ingestion module 220. To deploy and configure all the components of the system, an orchestrator 228 may be used. The orchestrator 228 is an essential component used in managing and deploying the queries as they are arriving and further providing feedback based on artificial intelligence training which can be used to adjust and optimize the compaction in the snapshot generation. Results may from the orchestrator 228 and simulated service 226 may thus be provided to a model analysis platform 230 wherein reports and other analytics may be presented and used by a user 104.

Note that in some instances, the simulated service 226 may also receive relevant simulated data from simulation datastore 224. This simulated data may include currently and previously run simulations that may be used in the analysis for presentation in conjunction with the model analysis platform 230. Also note that graph simulation system architecture 200 is but an exemplary architecture used for illustrating the generation of a temporal graph based datastore. Note that additional configurations may be possible and more or less components may be used. In addition, note that although a graph builder 222 is used herein, other components may be used for the generation of the journaling entries and temporal data store.

Figure 3:
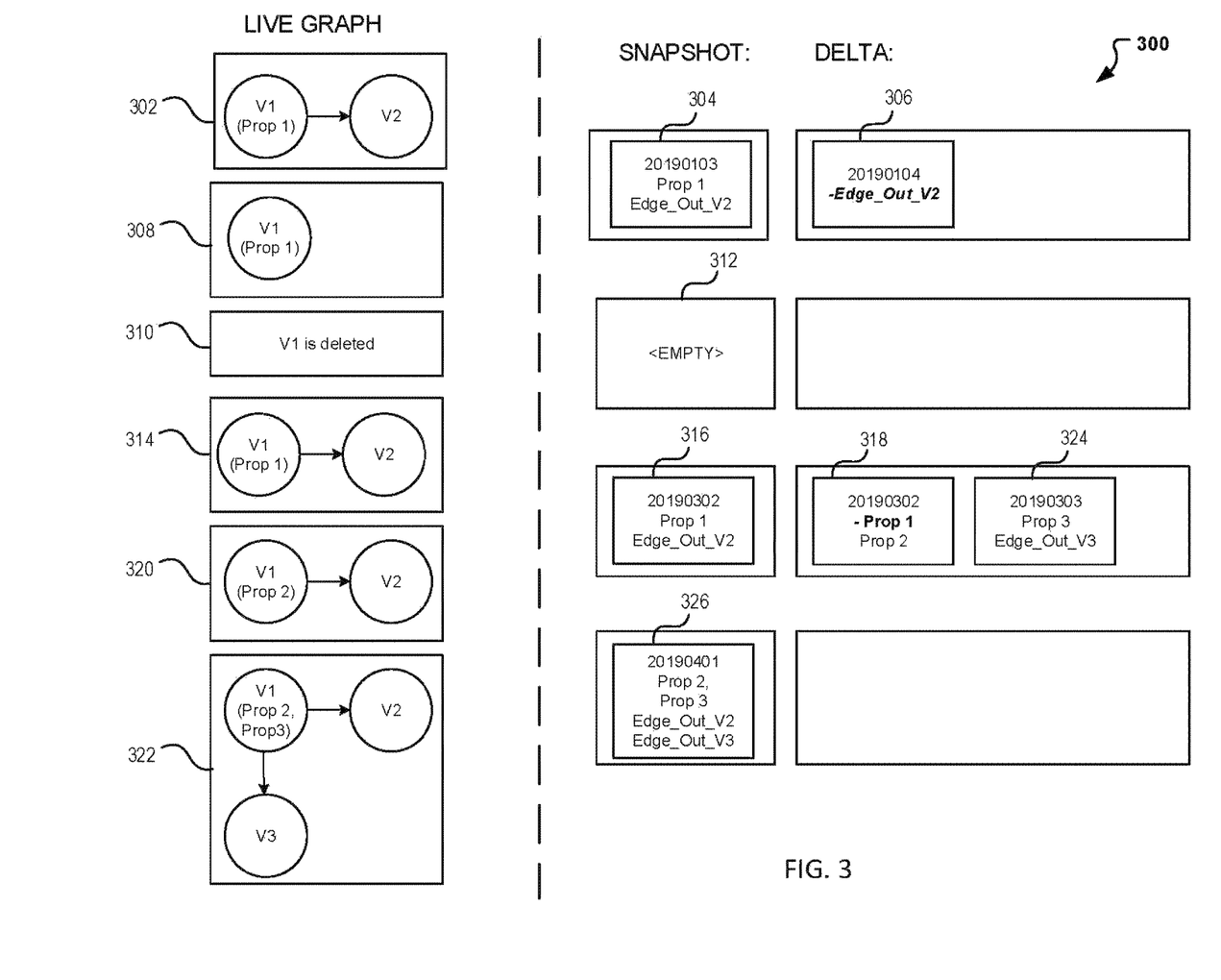
FIG. 3 illustrates exemplary block diagram of a temporal graph application.

To illustrate the graph based modeling and corresponding journal entries, FIG. 3 is presented. In particular, FIG. 3 illustrates exemplary block diagram 300 of a temporal graph application. At the left, the graph-based modeling is presented, with vertices and edges illustrating the activity occurring on the main node (specified vertex). On the right, journal entry changes or mutations are captured at least based in part by the graph simulation system 200 where the event logging component 206 and at least logging database 208 can capture and transmit to the graph log ingestion module 210 for simulation and journaling.

For exemplary purposes, the graphing and journaling occurring at FIG. 3 are presented as vertex centric. Accordingly, properties are vertex centric in the figure and any vertex can have properties, additions, removals, and verifications. As such, at the graph 302, a first vertex (V1) is illustrated with a first property (Prop 1) associated with by an edge to a second vertex (V2). At the simulation, journal entry 304 illustrating the timestamp (e.g., 20190103), the property associated with the vertex (Prop 1), and the vertex (V2) currently associated to V1 (Edge_out_V2). As time progresses (at new point-in-time timestamp 20190104) the V2 is deleted, then in simulation this will have a corresponding journal entry 306 illustrating the change, where the connection to V2 has now been removed and consequently graph 308 remains with only V1 displayed and its corresponding property (Prop 1).

Continuing with the example, V1 is now deleted and captured by the graph 310. As such, this deletion is ingested and updated at simulation with an empty journal entry 312. Further real-time updates continue to be received with now the V1 once again associated by an edge to V2 as illustrated at graph 314. Accordingly, the snapshot illustrates a new timestamp (20190302) with the vertex centric graph 316 indicating the property (Prop 1) associated with the V1 and its edge out to V2, the second vertex. At timestamp 20190302, a change in property is captured by the journal entry 318, with an update from previous Prop 1 to now Prop 2 and as illustrated by graph 320.

At real-time event logging, another association is captured by with an update to graph 322 for the association with yet another vertex V3 (and property Prop 3) to V1. The change captured by the journal entry 324 with the timestamp 20190303 indicating the association of V1 with an edge out to V3 with property Prop 3. With the two deltas (or mutations) occurring, a new journal entry snapshot 326 may be presented, prescribing the current state of the V1 including the temporal associations with V2, such that the entry includes the timestamp 20190401, the two vertices V2 and V3 and the corresponding properties (Prop 2 and Prop 3).

Note that the use of rows and columns used here are for exemplary purposes and the number of rows/columns may vary and may be adjusted based on the frequency of updates occurring on the variables and vertices. Also note that the entries and the vertex selected may be adjustable. In addition, because the graphing system 200 is vertex centric, the properties included are those associated with V1 with the vertex having the properties with the ability to be removed, updated, or otherwise modified. Properties as illustrated here, can be metadata that belongs to the vertex. For example, vertex 1 can be a device and property 1 can be the IP address of the device and property 2 can be a device ID. Also note that changes and mutations graphed and journaled introduced can include the update of a property, the addition/removal of a vertex, and any combination thereof. The journaling, graphing, snapshots, rows and labeling presented are for exemplary purposes and any change, addition, or updates may be further introduced. For example, the snapshot can be provided at fixed intervals, at vertex changes, based on the number of columns or rows, etc. Note that although the simulation is presented as vertex centric, the analysis can be performed as edge centric.

As indicated, large data is constantly being received and managed using this new temporal graphing and journaling approach. However, there may exist some instances where the data used and collected (e.g., a vertex) has many frequent updates and could benefit from optimization. The nature, type, and frequency of the data updated can afford to trade accuracy for gains in space and performance. In one embodiment, concatenation may be used as a configurable optimization scheme. For example, concatenation of columns may occur which is beneficial for vertices with frequent updates (e.g., several times per minute or second).

Figures 4A, 4B:
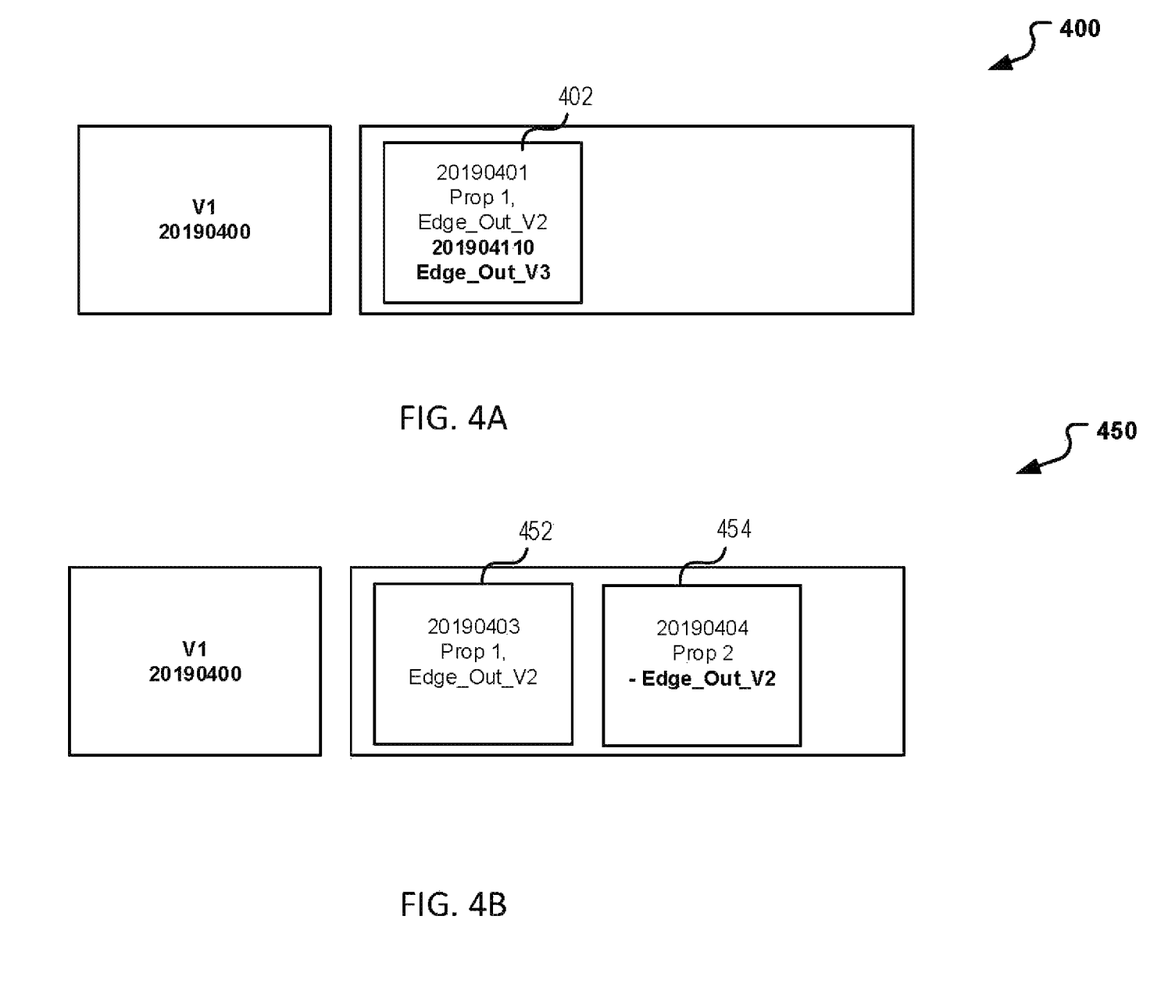
FIGS. 4A-4B illustrates exemplary block diagrams of temporal graph configurable optimizations.

To exemplify, consider FIGS. 4A-4B which illustrate exemplary block diagrams of temporal graph configurable optimizations. In particular, FIG. 4A illustrates an exemplary concatenation optimization 400 with the journaling completed as V1 centric with a snapshot of the consolidation at journal entry 402. As illustrate, with consolidation the journal entry 402 indicates the association of V1 with an edge to V2 at timestamp (20190410) with property 1 and in addition that V1 is was also associated to V3, which occurred at a different timestamp (201904110). As such, unlike the previous journaling entry from FIG. 3, where single journal entries where previously used for to indicate an edge to vertex association or removal, now a single more compact journal entry is provided with both vertices included. Note that concatenation can occur upon a query, after a given number of vertex updates, a given time interval, etc. Also note that concatenation may be used for one or more vertices which encounter frequent updates and whose journal entry may benefit from lesser journal entries with multiple timestamps while removing or reducing the journaling dimension.

Another form of optimization that may also occur in conjunction with temporal graphing and journaling is consolidation, as illustrated at FIG. 4B. Consolidation is a configurable optimization which may be performed on an intermittent basis. For example, consolidation is an optimization which can be scheduled for those vertices with frequent updates and can limit the updates journaled to once an hour, once a day, or whatever time frame needed and/or desirable by the user. To exemplify consolidation, consider optimized journal 450 wherein journal entries are limited as a tradeoff to space and accuracy. want to set. Thus, in consideration of the example of FIG. 3, wherein V1 had an edge out to V2 then removed and added again, these updates may be disregarded and instead only the most current update with the V1 edge out to V2 journaled. As another example, consider FIG. 4B, here as illustrated journal entries 452-454 are restricted to the association of V1 to V2 with property 1 and then a later entry illustrating the removal of V2 with a second property 2. Notice that the deletion of property 1 and addition of property 2 are not illustrated and instead a consolidated entry is illustrated showing the current change (or delta). Note that this type of consolidation can be applied to one or more vertices and is highly dependent on the nature of the data being considered, how important the vertex is, and how frequent the vertex is updated. Thus, optimization can occur on selected vertices whose selection may be based at least in part on an agreement with another partner, party, entity, and/or the resolution or granularity desired of the information. For example, if the vertex represents a page change, site click, application use or something of this nature where frequent updates are seen, then resolution may not high priority as time and efficiency. Accordingly, consolidation and optimization of the journal entries are available and still useful in generating highly scalable temporal graph databases with low latency. Note that other types of optimizations may exist and read/write feedback loops may further be available for use in optimization. Note that in some instances the entry consolidation and concatenation may occur at the graph snapshot generator while in other instances other components (not shown) may be included in the graph simulation system for optimization. Additionally, or alternatively, optimization may be configured and executed by the simulation service, at the model analysis, using learning models, and/or through manual intervention.

Figure 5:
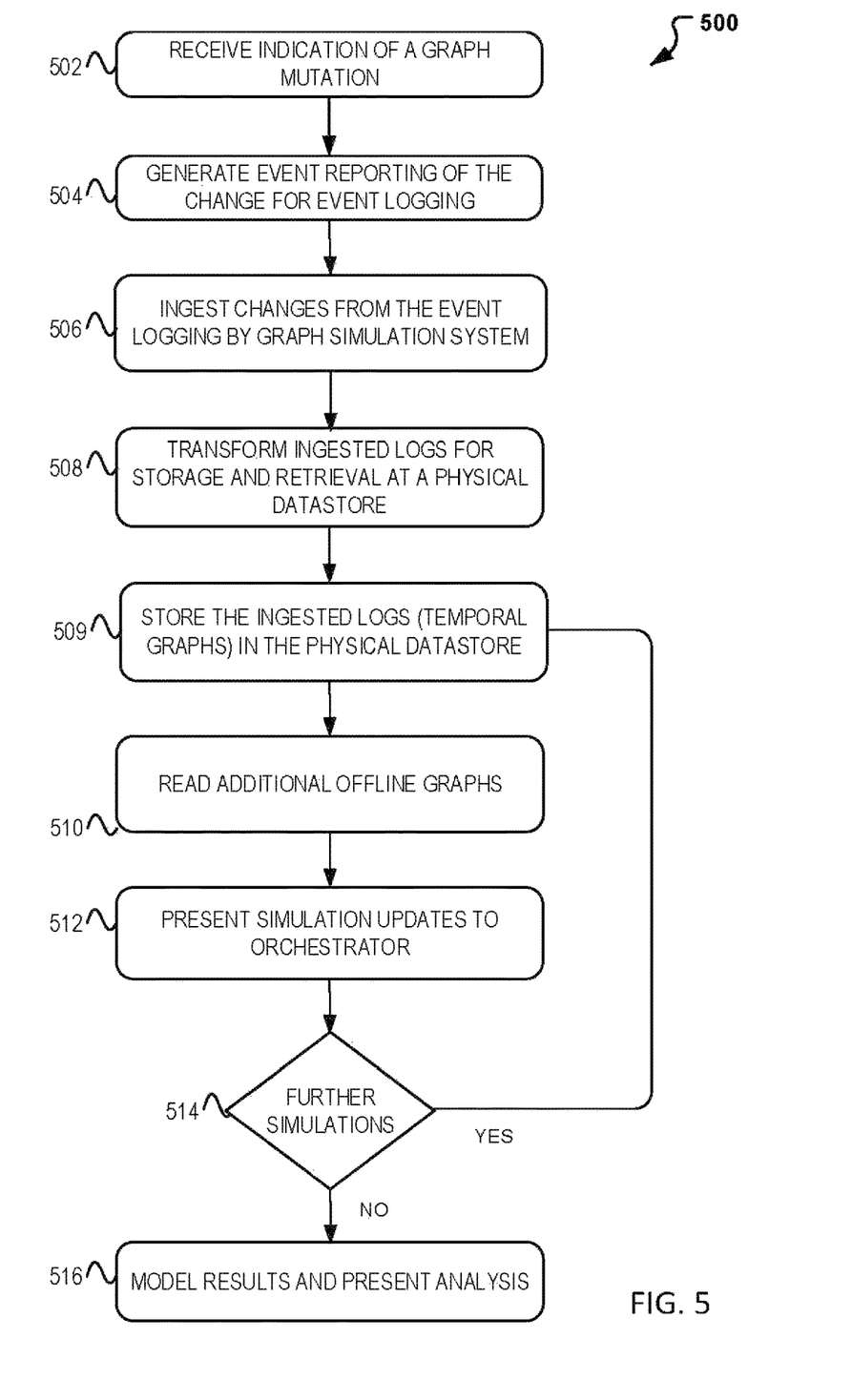
FIG. 5 illustrates a flow diagram illustrating operations for generating a temporal graph database.
Figure 6:
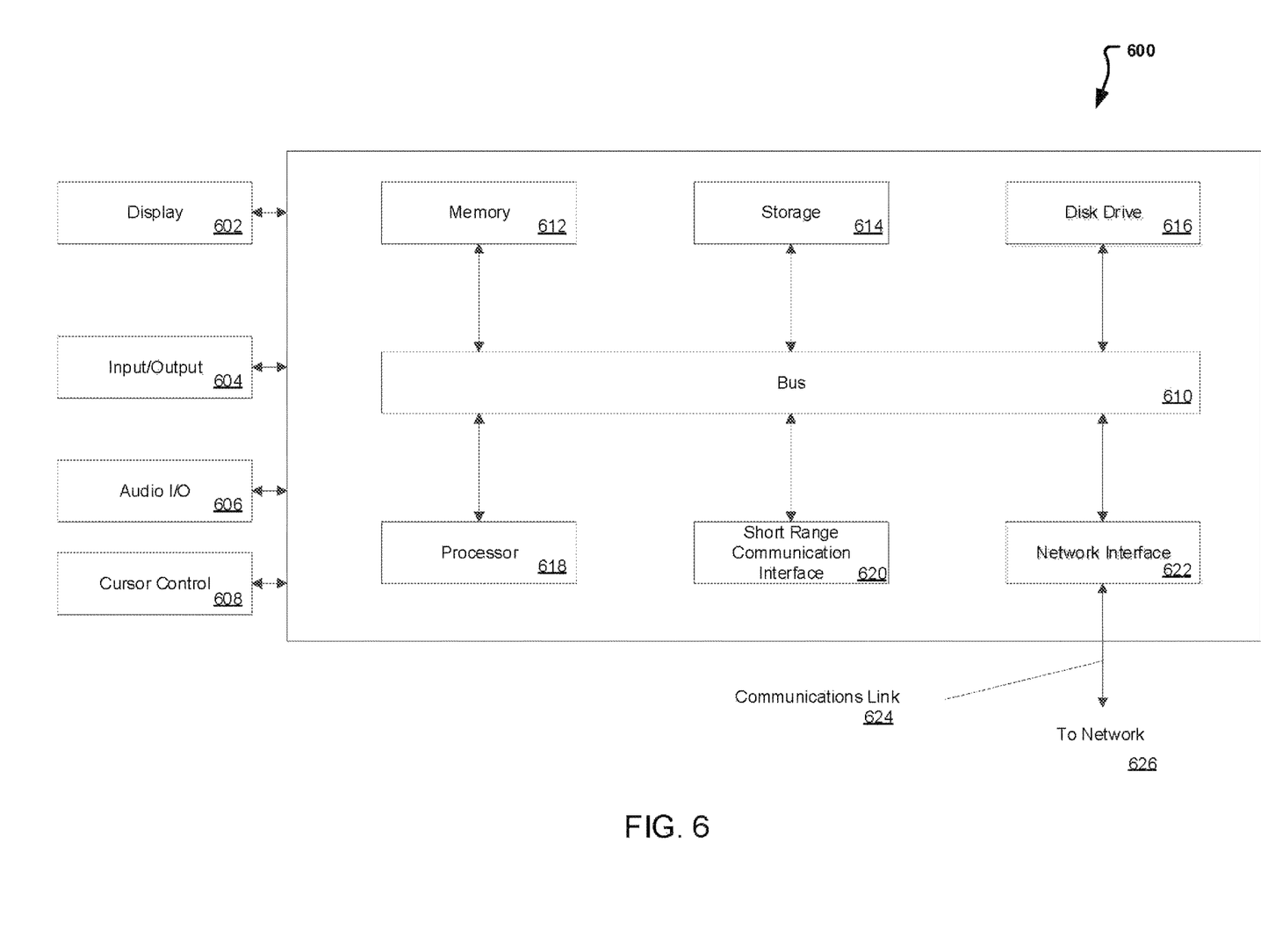
FIG. 6 illustrates an example block diagram of a computer system suitable for implementing one or more devices of the communication systems of FIGS. 1-5.

To illustrate how the graphing system may be used, FIG. 5 is introduced which illustrates an example process 500 that may be implemented on a system 600 of FIG. 6. In particular, FIG. 5 illustrates a flow diagram illustrating how to generate temporal graph databases for low latency relational querying. According to some embodiments, process 500 may include one or more of operations 502-516, which may be implemented, at least in part, in the form of executable code stored on a non-transitory, tangible, machine readable media that, when run on one or more hardware processors, may cause a system to perform one or more of the operations 502-516.

Process 500 may begin with operation 502, where an indication is received that a graph update or mutation is available. This indication may occur and be received by a live or real-time system designed to receive, manage, and store incoming event records. At the real-time system, an instance graph may receive the data which can intake any changes in the vertices and/or edges that occur (e.g., a new vertex getting connected, changed, delete). At operation 504, documentation and event reporting of the changes may occur at the event logging component and stored in distributed system or other logging database.

As the event logs are generated and stored, process 500 continues with operation 506 at the graph simulation system where the event logs are ingested for use in simulation. Ingestion may occur by a graph log ingestion module design to act as a pipeline to the event logs. As previously indicated, once received at the graph simulation system, processing of the events may begin with the transformation of the ingested event logs at operation 508. Transforming of the event logs include the conversion of the logs or data into a form acceptable for storage and retrieval from a physical datastore. Note that once transformed, the ingested logs may also be received by a graph snapshot generator design to snapshot the current changes and provide new entries as needed. That is to say, the graph snapshot generator determines when to insert the new entries and/or combine them with existing entries. Thus, the graph snapshot generator is designed to determine when to combine the current states of a journal entry and create a new row within a pre-existing entry with the update information.

At operation 510, optional and additional offline graphs may be introduced for use in further analysis. For example, an external graph builder may exist whose graph are consumed by a graph ingestion component which may be optionally used for use in making "what if" analysis. Therefore, users may inject additional offline generated graph information which can be used in conjunction with the historical graph data retrieved from the physical data store. Therefore, further to the results and entries identified by the graph reader additional entry results can also be provided. Continuing with process 500, at operation 512, to deploy and configure all the components of the system, an orchestrator is used for providing the simulation updates. In addition, as indicated, the orchestrator may also be used for managing and deploying the queries arriving and further providing feedback based on artificial intelligence training which can be used to adjust and optimize the compaction in the snapshot generation.

The orchestrator may also determine if other jobs, events, graphs or simulations are pending at operation 514. If further simulations are pending, process 500 can return back to operation 509 where the transformed ingested event logs are maintained and available for access and retrieval. Alternatively, if no simulations are pending, results may be presented and model at operation 516. Note that modeling and analysis can be presented on a user platform or other reporting system. Note that these operations are presented as exemplary processed and more or less operations may be involved in the process. In addition, the order of the operations and iteration of the features may occur during other operations and in some instances in parallel while the current process is taking place.

FIG. 6 illustrates an example computer system 600 in block diagram format suitable for implementing on one or more devices of the system in FIGS. 1-5 and in particular system of FIG. 2. In various implementations, a device that includes computer system 600 may comprise a personal computing device (e.g., a smart or mobile device, a computing tablet, a personal computer, laptop, wearable device, PDA, etc.) that can communicate with a network 626. A service provider and/or a content provider may utilize a network computing device (e.g., a network server) capable of communicating with the network. It should be appreciated that each of the devices utilized by users, service providers, and content providers may be implemented as computer system 600 in a manner as follows.

Additionally, as more and more devices become communication capable, such as new smart devices using wireless communication to report, track, message, relay information and so forth, these devices may be part of computer system 600. For example, windows, walls, and other objects may double as touch screen devices for users to interact with. Such devices may be incorporated with the systems discussed herein.

Computer system 600 may include a bus 610 or other communication mechanisms for communicating information data, signals, and information between various components of computer system 600. Components include an input/output (I/O) component 604 that processes a user action, such as selecting keys from a keypad/keyboard, selecting one or more buttons, links, actuatable elements, etc., and sending a corresponding signal to bus 610. I/O component 604 may also include an output component, such as a display 602 and a cursor control 608 (such as a keyboard, keypad, mouse, touchscreen, etc.). In some examples, I/O component 604 other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 618, which may be a micro-controller, digital signal processor (DSP), or other processing component, that processes these various signals, such as for display on computer system 600 or transmission to other devices over a network 626 via a communication link 624. Again, communication link 624 may be a wireless communication in some embodiments. Processor 618 may also control transmission of information, such as cookies, IP addresses, images, and/or the like to other devices.

Components of computer system 600 also include a system memory component 614 (e.g., RAM), a static storage component 614 (e.g., ROM), and/or a disk drive 616. Computer system 600 performs specific operations by processor 618 and other components by executing one or more sequences of instructions contained in system memory component 612 (e.g., for engagement level determination). Logic may be encoded in a computer readable medium, which may refer to any medium that participates in providing instructions to processor 618 for execution. Such a medium may take many forms, including but not limited to, non-volatile media, volatile media, and/or transmission media. In various implementations, non-volatile media includes optical or magnetic disks, volatile media includes dynamic memory such as system memory component 612, and transmission media includes coaxial cables, copper wire, and fiber optics, including wires that comprise bus 610. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 600 may also include a short-range communications interface 620. Short range communications interface 620, in various embodiments, may include transceiver circuitry, an antenna, and/or waveguide. Short range communications interface 620 may use one or more short-range wireless communication technologies, protocols, and/or standards (e.g., Wi-Fi, Bluetooth®, Bluetooth Low Energy (BLE), infrared, NFC, etc.).

Short range communications interface 620, in various embodiments, may be configured to detect other devices (e.g., device 102) with short range communications technology near computer system 600. Short range communications interface 620 may create a communication area for detecting other devices with short range communication capabilities. When other devices with short range communications capabilities are placed in the communication area of short-range communications interface 620, short range communications interface 620 may detect the other devices and exchange data with the other devices. Short range communications interface 620 may receive identifier data packets from the other devices when in sufficiently proximity. The identifier data packets may include one or more identifiers, which may be operating system registry entries, cookies associated with an application, identifiers associated with hardware of the other device, and/or various other appropriate identifiers.

In some embodiments, short range communications interface 620 may identify a local area network using a short-range communications protocol, such as WiFi, and join the local area network. In some examples, computer system 600 may discover and/or communicate with other devices that are a part of the local area network using short range communications interface 620. In some embodiments, short range communications interface 620 may further exchange data and information with the other devices that are communicatively coupled with short range communications interface 620.

In various embodiments of the present disclosure, execution of instruction sequences to practice the present disclosure may be performed by computer system 600. In various other embodiments of the present disclosure, a plurality of computer systems 600 coupled by communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 624 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the user and user device, however, a customer, a merchant, a service or payment provider may otherwise presented with tailored information. Thus, "user" as used herein can also include charities, individuals, and any other entity or person receiving information. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
a non-transitory memory storing instructions; and
one or more hardware processors configured to execute the instructions to cause the system to perform operations comprising:
receiving, via a wireless network communication, an event update associated with a first user account, wherein the event update is associated with a transaction conducted between the first user account and a second user account at a particular time;
determining a graph mutation on a graph-based model based in part on the event update;
ingesting an event log for the graph mutation;
transforming the ingested event log to a temporal-based journal entry recorded in a temporal-based journal, wherein the temporal-based journal entry represents a change of a first node corresponding to the first user account in the graph-based model based on a relationship between the first node and a second node corresponding to the second user account in the graph-based model;
identifying a particular time period prior to the particular time;
analyzing a set of transformations of the graph-based model that occurred within the particular time period based on one or more temporal-based journal entries recorded in the temporal-based journal, wherein the analyzing comprises determining that the set of transformations comprises a first transformation corresponding to establishing a first direct connection between the first node and a third node representing a device within the particular time period and a second transformation corresponding to establishing a second direct connection between the second node and the third node within the particular time period;
determining that the first user account has been used to perform a malicious activity based on the analyzing the set of transformations; and
performing an action to the first user account based on the determining that the first user account has been used to perform the malicious activity.

2. The system of claim 1, wherein the operations further comprise:
documenting the graph mutation in the event log; and
storing the event log.

3. The system of claim 1, wherein the operations further comprise:
ingesting a graph mutation simulation that simulates the graph mutation.

4. The system of claim 3, wherein the graph mutation simulation is created by an external graph builder.

5. The system of claim 1, wherein the operations further comprise:
deploying queries using the temporal-based journal entry.

6. The system of claim 1, wherein the temporal-based journal entry is vertex centric.

7. The system of claim 1, wherein the graph mutation includes a timestamp corresponding to the particular time.

8. A method comprising:
receiving, by one or more hardware processors, an event log associated with a first user account, wherein the event log indicates a transaction conducted between the first user account and a second user account at a first point in time;
determining a first transformation to a graph based on the event log, wherein the first transformation represents an establishment of a first connection between a first node corresponding to the first user account in the graph and a second node corresponding to the second user account in the graph based on the transaction, and wherein the first transformation is associated with a timestamp indicating the first point in time;
analyzing, by the one or more hardware processors, a set of transformations of the graph that occurred at different points in time within a particular time period prior to the particular time based on one or more temporal-based journal entries from a temporal-based journal, wherein the analyzing comprises determining that the set of transformations comprises a second transformation corresponding to an establishment of a second connection between the first node and a third node representing a device at a second point in time within the particular time period and a third transformation corresponding to an establishment of a third connection between the second node and the third node at a third point in time within the particular time period;
determining, by the one or more hardware processors, that the first user account has been used to perform a malicious activity based on the analyzing the set of transformations; and
performing, by the one or more hardware processors, an action to the first user account based on the determining that the first user account has been used to perform the malicious activity.

9. The method of claim 8, further comprising:
simulating a graph mutation based on the event log.

10. The method of claim 8, further comprising:
in response to a query indicating the first point in time, accessing a temporal graph-based journal entry corresponding to the first transformation from a physical data store.

11. The method of claim 8, further comprising:
generating a journal entry snapshot for the event log.

12. The method of claim 8, wherein the transaction comprises a purchase transaction for purchasing an item through the first user account from the second user account.

13. The method of claim 8, wherein the one or more temporal graph-based journal entries are node centric.

14. The method of claim 8, wherein the first transformation includes connecting the first node to the second node based on the transaction.

15. A non-transitory machine-readable medium having stored thereon machine-readable instructions executable to cause a machine to perform operations comprising:

receiving an event update associated with a first user account, wherein the event update is associated with a transaction conducted between the first user account and a second user account at a first point in time;

determining a graph mutation on a graph-based model based in part on the event update;

transforming an event log associated with the graph-based model to a temporal-based journal entry recorded in a temporal-based journal, wherein the temporal-based journal entry represents a first transformation of the graph-based model, wherein the first transformation corresponds to a change of a first node corresponding to the first user account in the graph-based model based on a relationship between the first node and a second node corresponding to the second user account in the graph-based model, and wherein the first transformation is associated with a first timestamp indicating the first point in time;

analyzing a set of transformations of the graph-based model that are associated with timestamps indicating different points in time within a predetermined time period prior to the point in time based on one or more temporal-based journal entries recorded in the temporal-based journal, wherein the analyzing comprises determining that the set of transformations comprises a second transformation corresponding to an establishment of a first direct connection between the first node and a third node representing a device at a second point in time within the predetermined time period and a third transformation corresponding to an establishment of a second direct connection between the second node and the third node at a third point in time within the predetermined time period;

determining that the first user account has been used to perform a malicious activity based on the analyzing the set of transformations; and performing an action to the first user account based on the determining that the first user account has been used to perform the malicious activity.

16. The non-transitory machine-readable medium of claim 15, wherein the operations further comprise:

ingesting a graph mutation simulation that simulates the graph mutation.

17. The non-transitory machine-readable medium of claim 16, wherein the graph mutation simulation is created by an external graph builder.

18. The non-transitory machine-readable medium of claim 15, wherein the operations further comprise:

deploying queries using the temporal-based journal entry.

19. The non-transitory machine-readable medium of claim 15, wherein the temporal-based journal entry is vertex centric.

20. The non-transitory machine-readable medium of claim 15, wherein the transaction comprises a purchase of an item through the first user account from the second user account.

* * * * *